UNITED STATES PATENT OFFICE.

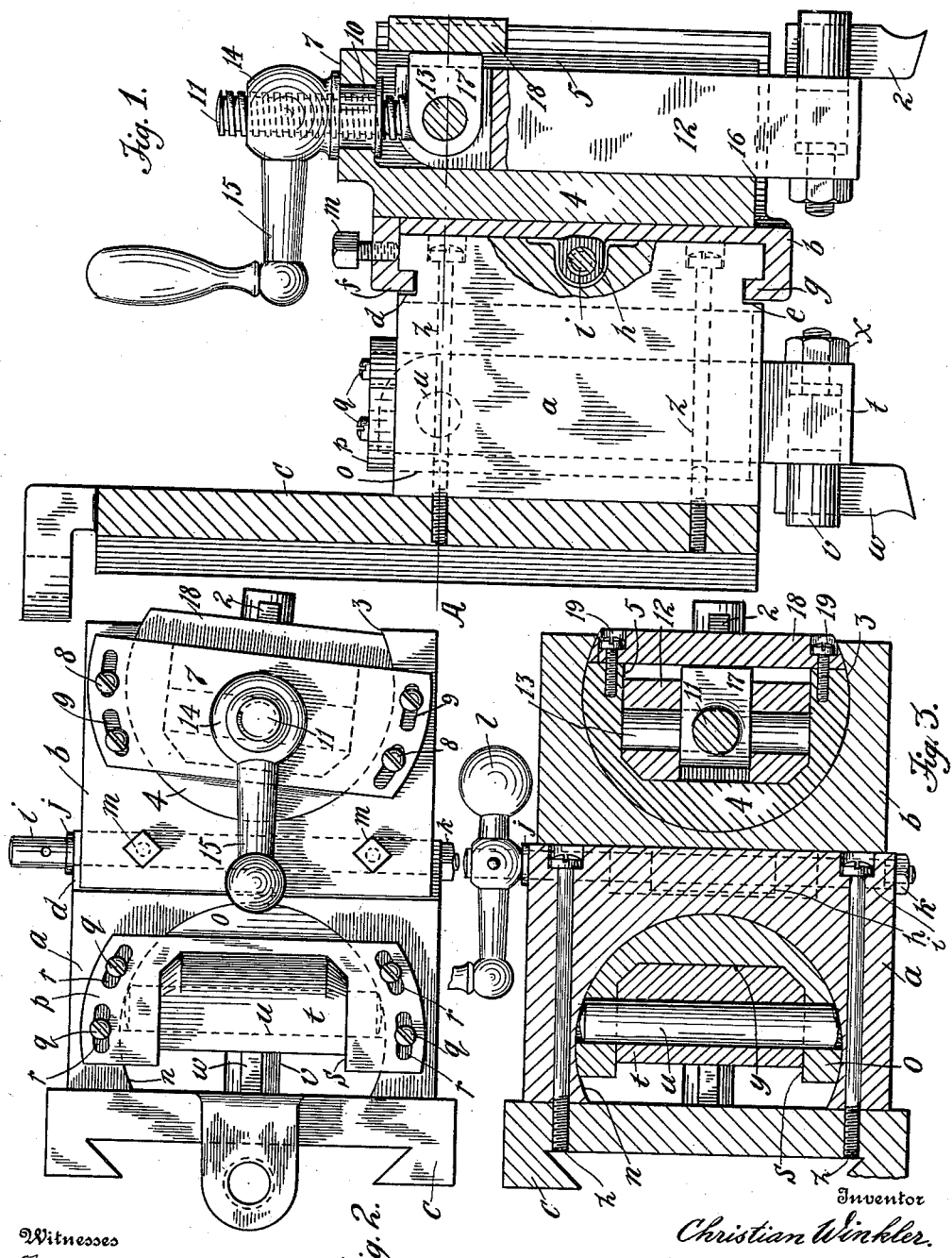

CHRISTIAN WINKLER, OF PORTLAND, OREGON.

DUPLEX TOOL-SUPPORT.

1,009,005.   Specification of Letters Patent.   Patented Nov. 14, 1911.

Application filed March 6, 1911. Serial No. 612,449.

*To all whom it may concern:*

Be it known that I, CHRISTIAN WINKLER, a citizen of the United States, residing at Portland, in the county of Multnomah and State of Oregon, have invented certain new and useful Improvements in Duplex Tool-Supports, of which the following is a specification.

My invention relates to means for supporting the cutting tools of a planing machine, and my object in the first instance is to provide an improved device of this character adapted to support two tools, the cutting faces of which are presented in opposite directions, and which are hung in such a manner that one tool performs its function when the machine moves in a forward direction, while the other tool performs its cutting function on the return motion of the machine.

More particularly my aim is to provide means for readily adjusting the two cutting tools of my device independently, both relative to cutting depth and longitudinal alinement. To this end I pivotally mount the cutting tools in cylindrical slides, adapted for both vertical and circumferential adjustment.

The objects of my invention are clearly set forth in the following description and illustrated in the appended drawing of which:

Figure 1 is a side elevation, partly in section, of a tool support embodying my invention. Fig. 2 is a plan view of my device, showing one of the cylindrical tool holders rotated on its axis and Fig. 3 is a sectional plan view taken on line A of Fig. 1.

My device comprises two main bodies $a$ and $b$, transversely adjustable in relation to each other, but otherwise firmly held together by transverse projections $f$, $g$ of body $b$ lodging in grooves $d$, $e$ of body $a$. Body $b$ is made with a perforated boss $h$, threaded to receive a screw $i$ which extends transversely through body $a$, and is held against longitudinal displacement relative to said body by its shoulder $j$, engaging one side of the body and a locknut $k$ applied to the screw on the opposite side of the body. A crank $l$, secured to the shouldered end of screw $i$, is rotated until body $b$ is correctly positioned relative to body $a$, and the two bodies are then rigidly locked together by set screws $m$. Body $a$ is by a series of bolts $z$ secured to a slide $c$, which forms the means of attaching my device to the head of a planing machine. As the constructions of a planer and a planer head are well known, these are not shown in the drawings.

A cylindrical groove $n$ extends vertically the entire length of body $a$ and presents its open face in the direction of slide $c$. A cylindrical slide $o$, made with a flanged head $p$, is inserted in groove $n$ and secured to body $a$ by clamping screws $q$. The holes $r$, of the flanged head $p$, through which screws $q$ extend, are elongated to permit of adjusting the slide circumferentially in the groove. Slide $o$ is provided with a rectangular recess $s$, in which I mount a toolpost $t$, on a pivot $u$, confined in a transverse perforation of the slide. The toolpost projects below body $a$, and is provided at the bottom with a cylindrical bore in alinement with the travel of the machine, and a shouldered stud $v$, perforated to receive a cutting tool $w$, is mounted in said post.

To those familiar with machines of this class, it is clearly seen, that the cutting tool can be adjusted in the toolpost by turning stud $v$, which, when the tool is properly adjusted, is firmly locked in position by drawing up the clamping nut $x$.

Slide $c$ carrying body $a$ is, as mentioned, vertically adjustable in the head of the planing machine, and said head, as is well known, is provided with horizontal adjustment. Toolpost $t$ is circumferentially adjustable in body $a$ on a horizontal plane, and cutting tool $w$ is similarly adjusted in the toolpost on a vertical plane. Thus the cutting tool is readily positioned to perform difficult planing operations. The back of the toolpost is well supported on the inner surface $y$ of slide groove $s$, when the tool performs its cutting operation on its forward motion, but in returning, the toolpost can swing on its pivot $u$ and thus permit the tool to yield.

Body $b$ in which is mounted a second cutting tool 2, is constructed in a manner very similar to that of body $a$, only that the two bodies are locked together back to back, so that the two cutting tools present their cutting edges in opposite directions. After cutting tool $w$ of body $a$ is properly adjusted and clamped in position, the second cutting tool 2 is independently adjusted in a similar manner.

As already described, body $b$ is adjusted horizontally by revolving crank 1, and the body is made with a cylindrical groove 3, similar to groove s, in which is mounted a cylindrical slide 4, made with a rectangular groove 5 adapted to receive the toolpost 12. The flanged head 7 of slide 4 is secured to the top of body b by screws 8, and is adjustable circumferentially within the limits of the elongated perforations 9. A circular perforation is provided in the center of flange head 7, a bushing 10 is fixed in said perforation and adapted to receive a bolt 11, on which the toolpost 12 is journaled by means of a pivot 13. Said pivot extends transversely through post 12; the toolpost and bolt 11, thus combined, are adjusted vertically through the medium of a threaded nut 14, engaging the screwthreads of bolt 11 and provided with a crank 15.

The method of clamping cutting tool 2 to toolpost 12 is the same as described in connection with cutting tool w. When tool 2 moves forward and performs its cutting operation, the pressure against the tool causes toolpost 12 to pivot on the lower edge 16 of slide 4, thereby throwing a great strain on bolt 11. To relieve this strain, I provide said bolt with an enlarged head 17 which abuts a brace plate 18, secured to slide 4 by a series of screws 19.

I claim:

1. In combination in a tool supporting device: a supporting body a, a grooved cylinder secured in said body a, adjustable circumferentially, a toolpost, pivotally hung in said cylinder, and provided with means for holding a cutting tool; supporting body b, disposed in the opposite direction, a grooved cylinder supported in said body b, circumferentially adjustable, a toolpost pivotally hung in said cylinder, and provided with means for holding a cutting tool.

2. In combination in a tool supporting device: supporting body a, a grooved cylinder secured in said body a, adjustable circumferentially, a toolpost, pivotally hung in said cylinder, and provided with means for holding a cutting tool; supporting body b, disposed in the opposite direction, secured to and transversely adjustable on body a, a grooved cylinder supported in said body b, circumferentially adjustable, a toolpost pivotally hung in said cylinder, and provided with means for holding a cutting tool.

3. In combination in a tool supporting device: supporting body a, a grooved cylinder supported in said body a, adjustable circumferentially; a toolpost pivotally hung in said cylinder, provided with means for holding a cutting tool; supporting body b, disposed in the opposite direction, secured to and transversely adjustable on body a; a grooved cylinder secured in said body b, circumferentially adjustable; a toolpost, pivotally hung in said cylinder; means for vertically adjusting said toolpost, and said toolpost provided with means for holding a cutting tool.

4. In combination in a tool supporting device: a supporting body a, a grooved cylinder secured in said body a, adjustable circumferentially; a toolpost pivotally hung in said cylinder, provided with means for holding a cutting tool; supporting body b, disposed in the opposite direction, secured to and transversely adjustable on body a; a grooved cylinder, secured in said body b, circumferentially adjustable in body b, provided with a flanged head, perforated to receive an adjusting bolt, a toolpost adapted to hold a cutting tool and pivotally hung in said cylinder, a pivot transversely mounted in said toolpost, on which said bolt journals, a threaded nut bearing on the top of the cylinder head, adapted to engage the screw threads of said bolt, and provided with an operating handle.

5. In combination in a tool supporting device: a supporting body a, a grooved cylinder secured in said body a, adjustable circumferentially, a toolpost pivotally hung in said cylinder, provided with means for holding a cutting tool; supporting body b, disposed in the opposite direction, secured to and transversely adjustable on body a, a grooved cylinder, secured in said body b, circumferentially adjustable in body b, provided with a flanged head, perforated to receive an adjusting bolt, a toolpost adapted to hold a cutting tool and pivotally hung in said cylinder, a pivot transversely mounted in said toolpost, on which said bolt journals, a threaded nut bearing on the top of the cylinder head, adapted to engage the screw threads of said bolt, and provided with an operating handle, said adjusting bolt provided with an enlarged head abutting a brace plate secured to said cylinder.

In testimony whereof I affix my signature in presence of two witnesses.

CHRISTIAN WINKLER.

Witnesses:
 THOS. F. BRADSHAW,
 FRED. A. COOK.